United States Patent
Lee

(10) Patent No.: US 8,341,087 B2
(45) Date of Patent: Dec. 25, 2012

(54) METHOD FOR IMPLEMENTING AND APPLICATION OF A SECURE PROCESSOR STICK (SPS)

(75) Inventor: Kwang Wee Lee, Singapore (SG)

(73) Assignee: Cassis International Pte Ltd, Singapore (SG)

( * ) Notice: Subject to any disclaimer, the term of this patent is extended or adjusted under 35 U.S.C. 154(b) by 0 days.

(21) Appl. No.: 12/660,723

(22) Filed: Mar. 3, 2010

(65) Prior Publication Data

US 2011/0219148 A1     Sep. 8, 2011

(51) Int. Cl.
*G06Q 20/00* (2012.01)

(52) U.S. Cl. ............... 705/65; 705/64; 705/71; 705/73; 705/74; 705/67

(58) Field of Classification Search ............. 710/13
See application file for complete search history.

(56) References Cited

U.S. PATENT DOCUMENTS

| | | | |
|---|---|---|---|
| 6,405,278 B1 | 6/2002 | Liepe | |
| 7,296,098 B2 * | 11/2007 | Shih | 710/13 |
| 7,409,477 B2 * | 8/2008 | Wyatt et al. | 710/62 |
| 7,702,821 B2 * | 4/2010 | Feinberg et al. | 710/13 |
| 2002/0049803 A1 | 4/2002 | Bandhole et al. | |
| 2002/0174337 A1 | 11/2002 | Aihara | |
| 2003/0043771 A1 | 3/2003 | Mizutani et al. | |
| 2007/0073937 A1 * | 3/2007 | Feinberg et al. | 710/62 |
| 2008/0146178 A1 | 6/2008 | Lu et al. | |
| 2008/0320181 A1 | 12/2008 | Lauterbach et al. | |
| 2010/0194667 A1 | 8/2010 | Lee et al. | |
| 2010/0197289 A1 | 8/2010 | Lee et al. | |
| 2010/0197347 A1 | 8/2010 | Lee | |
| 2010/0198994 A1 | 8/2010 | Lee | |
| 2010/0199008 A1 | 8/2010 | Lee et al. | |
| 2011/0004840 A1 * | 1/2011 | Feinberg et al. | 715/772 |
| 2011/0060775 A1 * | 3/2011 | Fitzgerald | 707/824 |

FOREIGN PATENT DOCUMENTS

| | | |
|---|---|---|
| CN | 1 561 124 | 1/2005 |
| DE | 199 35 888 | 2/2000 |
| DE | 20 2004 020 819 | 5/2006 |
| EP | 0 994 614 | 4/2000 |
| EP | 1 450 516 | 8/2004 |
| EP | 1 460 820 | 9/2004 |
| FR | 2 854 261 | 10/2004 |
| GB | 2 317 246 | 3/1998 |

(Continued)

OTHER PUBLICATIONS

U.S. Appl. No. 61/206,454, Lee, et al.

(Continued)

*Primary Examiner* — Chun-Kuan Lee
*Assistant Examiner* — Ronald Modo
(74) *Attorney, Agent, or Firm* — James R. Klaiber; Pryor Cashman LLP

(57) ABSTRACT

Systems and methods for implementing a secure processor stick are described. In one aspect, the system for implementing a secure processor stick with a computer, the system comprising: a secure processor stick, including: a processor; a memory coupled to said processor; a smart chip coupled to said processor, said smart chip storing data for implementing a secure environment; and an operating system adapted to run on said memory and said processor, wherein said operating system is adapted to provide a secure environment for display on a computer using said data.

28 Claims, 5 Drawing Sheets

FOREIGN PATENT DOCUMENTS

| | | |
|---|---|---|
| GB | 2 450 570 | 12/2008 |
| WO | WO 2008/011727 | 1/2008 |
| WO | WO 2010/086711 | 8/2010 |
| WO | WO 2010/086712 | 8/2010 |
| WO | WO 2010/086714 | 8/2010 |
| WO | WO 2010/086731 | 8/2010 |

OTHER PUBLICATIONS

U.S. Appl. No. 12/386,211, filed Aug. 5, 2010, Lee, et al.
U.S. Appl. No. 51/206,453, Lee.
U.S. Appl. No. 12/386,212, filed Aug. 5, 2010, Lee.
U.S. Appl. No. 61/206,427, Lee, et al.
U.S. Appl. No. 12/386,208, filed Aug. 5, 2010, Lee, et al.
U.S. Appl. No. 61/206,797, Lee.
U.S. Appl. No. 12/386,213, filed Aug. 5, 2010, Lee.
U.S. Appl. No. 12/386,210, filed Aug. 5, 2010, Lee, et al.
U.S. Appl. No. 12/660,723, Lee.
Feb. 16, 2010 Martyn Williams, "SK Telecom Crams Android, Processor Inside a SIM Card", PC World.
Feb. 17, 2010 IDG News Service, "Prototype SIM Card Holds Processor, Memory, Storage and the Android OS", PC World.
Jul. 8, 2010 International Search Report and Written Opinion, for PCT/IB2010/000177.
Jul. 8, 2010 International Search Report and Written Opinion, for PCT/IB2010/000153.
Jul. 8, 2010 International Search Report and Written Opinion, for PCT/IB2010/000684.
Jul. 12, 2010 Invitation to Pay Additional Fees, and Partial International Search, for PCT/IB2010/000150.
Jul. 12, 2010 Invitation to Pay Additional Fees, and Partial International Search, for PCT/IB2010/000151.
Aug. 11, 2011 PCT International Premliminary Report on Patentability with Written Opinion for PCT/IB2010/000150.
Aug. 11, 2011 PCT International Premliminary Report on Patentability with Written Opinion for PCT/IB2010/000177.
Aug. 11, 2011 PCT International Premliminary Report on Patentability with Written Opinion for PCT/IB2010/000151.
Aug. 11, 2011 PCT International Premliminary Report on Patentability with Written Opinion for PCT/IB2010/000153.
Oct. 27, 2011 PCT International Premliminary Report on Patentability with Written Opinion for PCT/IB2010/000684.

\* cited by examiner

METHOD FOR IMPLEMENTING AND APPLICATION OF A SECURE PROCESSOR STICK (SPS)

CROSS-REFERENCE TO RELATED APPLICATIONS

This application claims priority to U.S. Provisional Patent Applications Ser. Nos. 61/206,454, 61/206,453, and 61/206,427, filed Jan. 30, 2009, and U.S. Provisional Patent Application Ser. No. 61/206,797, filed Feb. 4, 2009, the disclosures of which are incorporated herein by reference. This application also claims priority to U.S. patent application Ser. Nos. 12/386,208, 12/386,210, 12/386,211, 12/386,212 and 12/386,213, filed Apr. 14, 2009, the disclosures of which are incorporated herein by reference.

FIELD OF THE INVENTION

The invention relates to running secure processes or applications in a secure environment on a secure processor stick for display on a PC without using or leaving traces in the PC memory.

BACKGROUND OF THE INVENTION

In the present PC environment, viruses, spyware and malware may be present in PCs, which may compromise valuable data or transactions. USB devices like secure token may perform cryptography, secure key generation and storage. However, secure tokens still require the application to be run on the PC with the plan information and data to access this feature and this leave the plain information and data before encryption vulnerable to attack.

IBM's USB secure stick, the Zone Trusted Information Channel, has an on-board processor used to create a secure socket layer ("SSL") channel, but not for running a secure application. The application is still using the host PC memory and leaves a memory trace on the host PC that is vulnerable to a virus or spyware attack.

Penprotect software for a host PC uses encryption to protect files within a USB flash drive, flash memory, or USB stick. But Penprotect software does not protect the encrypted files once they are decrypted and running on the host PC. Furthermore, the same encrypted files stored in the USB memory stick require Penprotect software to be installed on another PC before they can be accessed, so the encrypted files are not portable.

Livetoken is a USB drive with a Linux OS and a secure chip installed on it to store the keys and passwords. However, Livetoken's design requires the host PC to be rebooted to run the OS on the USB drive. Furthermore, the Linux OS is very dependent on the host PC hardware configuration, and will not work on any other host PC.

U3 technology from Sandisk allows a portable application in a USB flash drive to be used only on a Windows XP or Windows Vista PC. This provides only application portability, but not security for the application and data execution on the host PC because U3 technology uses the host PC memory to execute the portable application. This leaves the U3 technology open for attack from a virus or spyware.

SUMMARY OF THE INVENTION

This disclosure describes a secure processor stick ("SPS") for use with a computer. The SPS may provide a secure processing environment in any computer environment, including but not limited to an unsecured environment like a virus infected system or a cyber café. The secure application to be run securely is executed in the SPS's processor and memory; it does not make use of the host PC memory and does not leave any memory traces in the host PC.

BRIEF DESCRIPTION OF THE DRAWINGS

Features and other aspects of embodiments of the present invention are explained in the following description taking in conjunction with the accompanying drawings, wherein.

DETAILED DESCRIPTION

Various embodiments of the present invention will now be described in greater detail with reference to the drawings.

Figure 1:
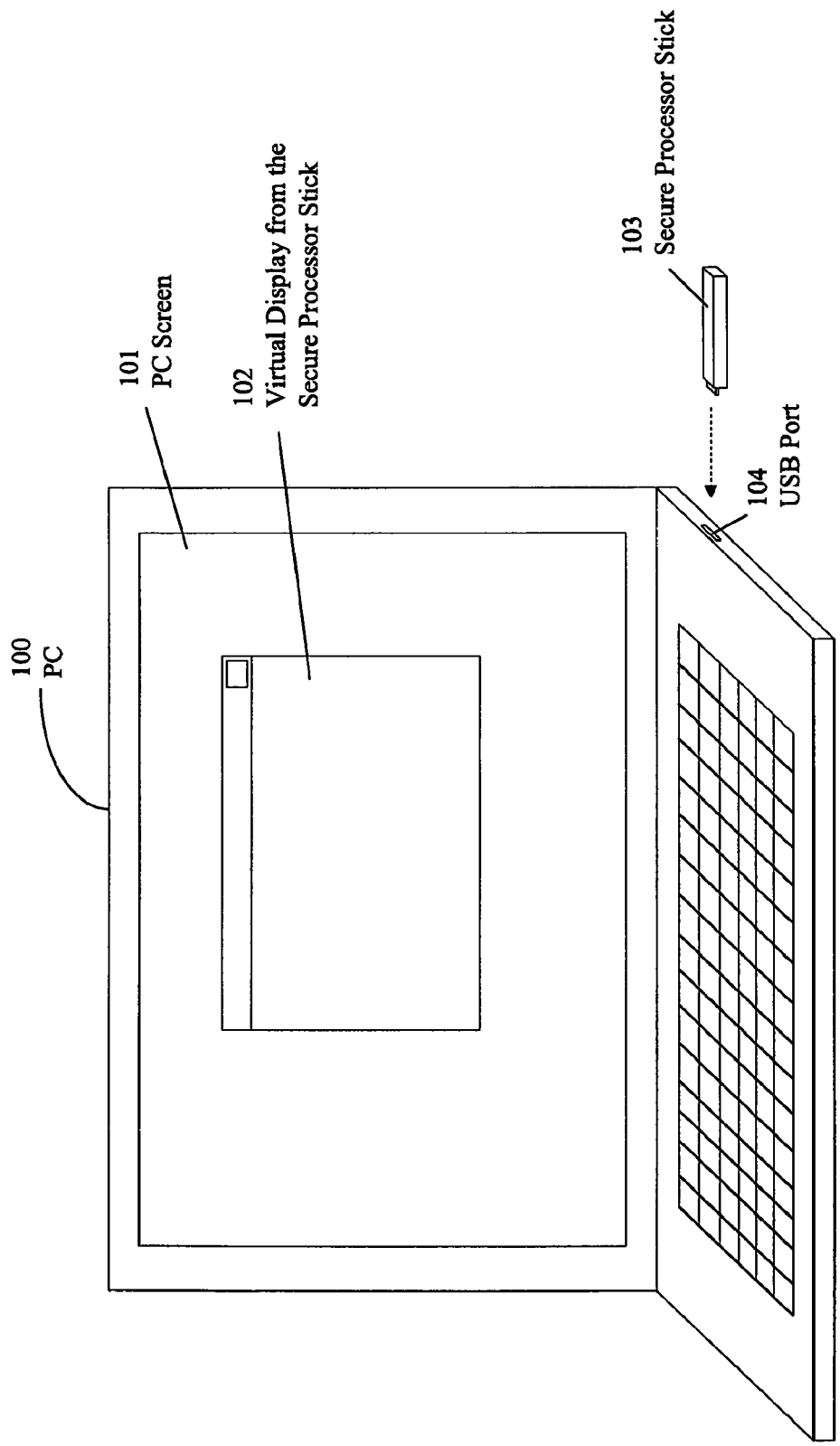
FIG. 1 illustrates a schematic diagram showing the interface between the SPS and the host PC according to an embodiment of the invention.

As shown in FIG. 1, an example of a secure processor stick 103 may interface with a PC 100 via a USB port 104. As used herein, the PC may be a laptop, palmtop, netbook, notebook, desktop, or any other general-purpose computer having a port capable of interfacing with an SPS. Once connected, the secure processor stick 103 may display a virtual display 102 on the PC screen 101. The connection to the host PC 100 may be made by USB 104, firewire, or any network connection to the host PC 100. SPS network connectivity may be provided by the host PC 100 through a TCP/IP bridge on the USB port 104 where the SPS 103 accesses the network using VPN, SSL or encryption. The UI/Display for the SPS OS and application may be displayed as a window on the host PC screen 101 in a window 102. The screen/UI may be transferred from a virtual screen bitmap in the SPS 103 to the host PC 100 window via USB 104. The process/application running on the SPS 103 may not leave raw data on the host PC 100, and there may not be a memory trace on the host PC 100 from the application/process running. A firewall on the SPS 103 may restrict the access only to a VPN or secure host. A host PC 100 may have no access to the SPS files or data. The data and files on the SPS 103 may be secure and may be encrypted using a smart chip for added security. The SPS 103 may be the size of a USB flash drive and can be easily kept by the owner at all times for portability and security.

Linux version 2.6.28.2 may be used as the OS for the SPS 103, and an ARM 9 processor may be used as the SPS processor. An NXP LPC3131 development board may be used for the components in the SPS 103. The USB port 104 may be used as the interface between the ARM 9 processor and the host PC 100 as shown in FIG. 1. The USB on the SPS 103 may be a composite USB device with both a CD-ROM component, which may install the PC application, and a CDC Ethernet class component, which may facilitate communication between the ARM 9 processor and the virtual display, input devices, and networking of the host PC 100.

Figure 2:
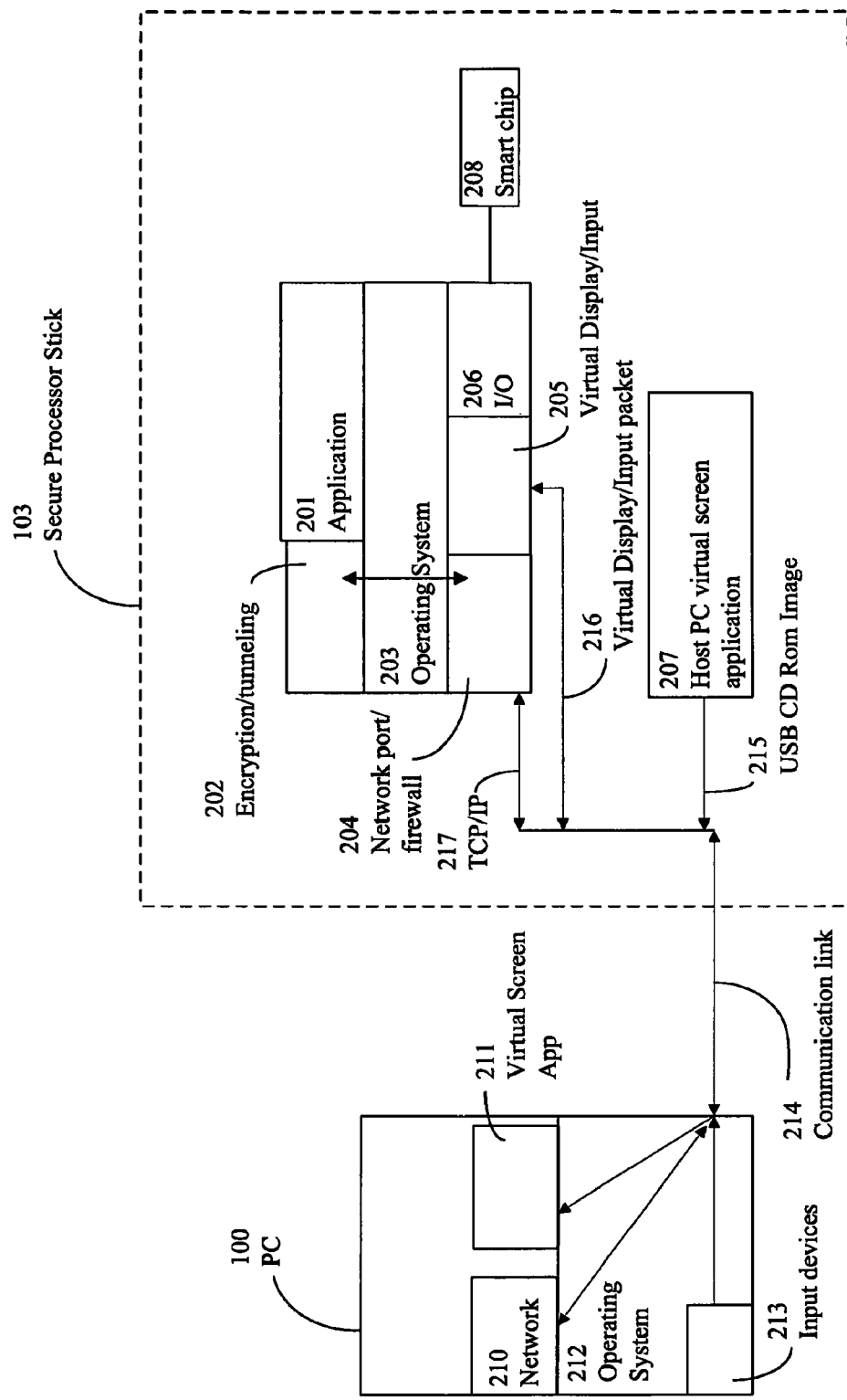
FIG. 2 illustrates a block diagram showing the software stack for the SPS according to an embodiment of the invention.

FIG. 2 illustrates the software stack for the SPS 103. The SPS 103 may contain only the processor, a memory, and a smart chip 208. The smart chip 208 may be used to store the key and the data encryption algorithm. Within the SPS 103, an SPS application 201 and encryption and tunneling software 202 may interface with a network port 204, a virtual display and virtual input 205, and input/output 206 via an operating system 203. The smart chip 208 may interface directly with the input/output 206 to ensure encrypted data transmission. A composite USB device 214 may connect the SPS 103 with the PC 100. The network port 204 may contain a firewall. The network port 204 may communicate with the PC 100 via the composite USB device 214 via TCP/IP 217. The virtual display and virtual input 205 may communicate with the PC 100 via the composite USB device 214 via a virtual display and virtual input packet 216, respectively. The host PC virtual screen application 207 may communicate with the PC 100 via the composite USB device 214 via a USB CD-ROM image 215. On the PC 100, the PC operating system 212 may direct the PC input devices 213 to transmit data via the composite USB device 214 to the virtual input 205 on the SPS 103. In another aspect, the PC operating system 212 may direct the PC network software and/or hardware 210 to transmit and receive data via the composite USB device 214 to and from the TCP/IP 217 on the SPS 103. In another aspect, the PC operating system 212 may direct the virtual screen application 211 to receive data via the composite USB device 214 from the host PC virtual screen application 217 on the SPS 103.

User Interface (UI) and Display

Figure 3:
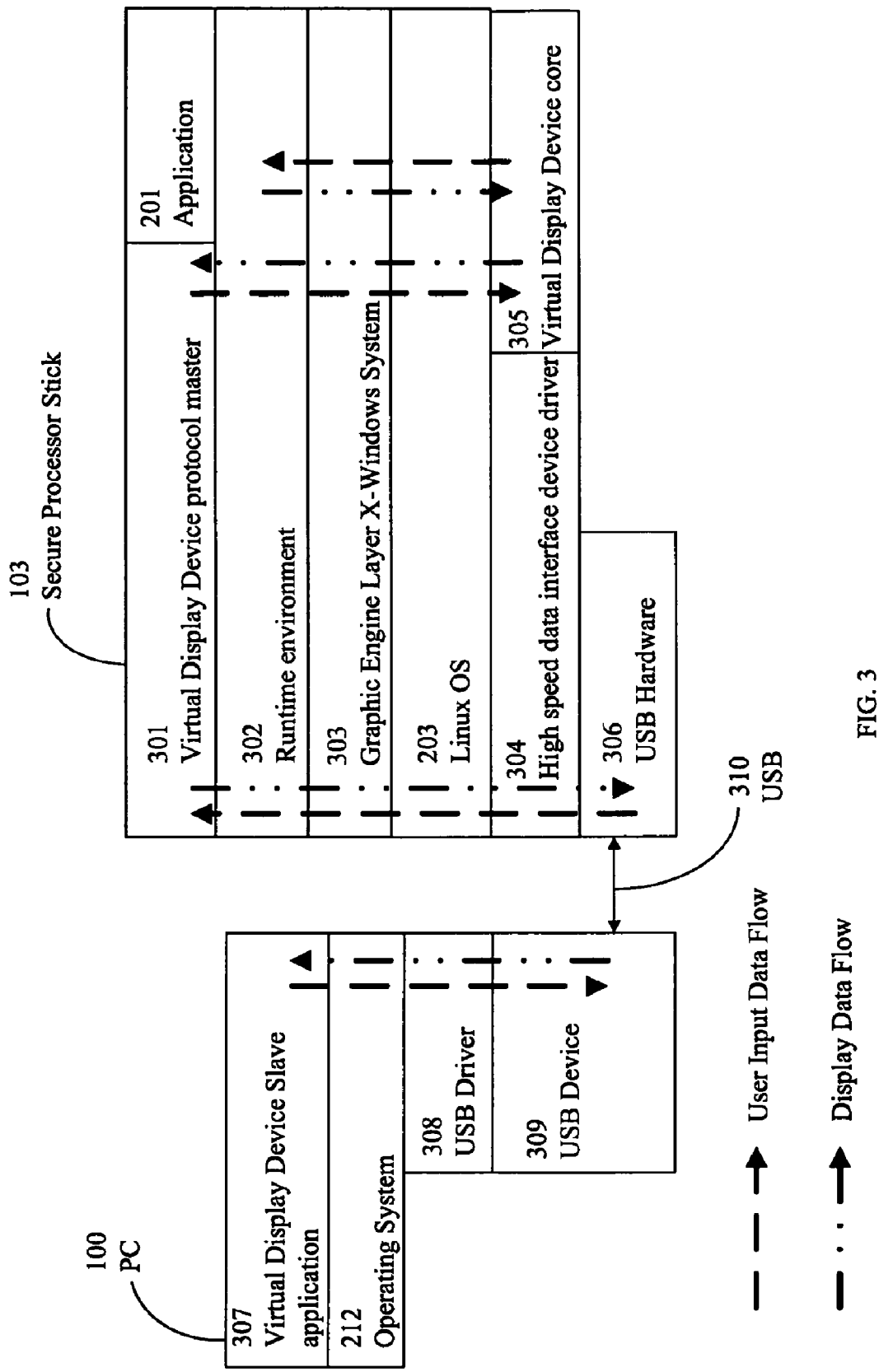
FIG. 3 illustrates a block diagram showing the software stack for transferring the virtual screen on the secure process stick to the host PC according to an embodiment of the invention.

The SPS 103 may not contain a display, so there may be a need to display the UI for the OS 203 and the application 201 running on it. This may be accomplished by opening a window 102 in the host PC 100 to display the display buffer of the SPS screen. This process is covered and explained by U.S. patent application Ser. No. 12/386,211 for "System and Method for Implementing a Remote Display Using a Virtualization Technique," which is incorporated fully by reference herein. FIG. 3 illustrates one embodiment of the software stack for transferring the virtual screen on the secure process stick 103 to the PC 100 using an application. In this way, only display pixels may be transferred from the SPS 103 to the host PC's Virtual Display Device slave application 211 without necessarily communicating other information or data to the host PC 100.

FIG. 3 illustrates a prototype setup of the virtual display on the SPS 103 interfacing with a PC 100. The software on the SPS 103 may exist in layers, with a Virtual Display Device protocol master 301 and an application 201 interfacing through a runtime environment 302 a graphic engine layer 303, and an operating system 203 with a high speed data interface device driver 304 and a virtual display device core 305. The high speed data interface device driver 304 may communicate with the PC 100 using the USB hardware 306 via the USB connection 310. The PC 100 may have a virtual display device slave application 307 that runs on an operating system 212. The operating system 212 may interface with a USB driver 308 have a USB device 309 that communicates with the SPS 103. In one embodiment, the virtual display device slave application 307 may receive display information from the virtual display device protocol master 301 via the USB connection 310.

User Interface (UI) and Keyboards, Mice, and Other Inputs

When the mouse is clicked on the virtual display from the SPS window 102, the mouse and keyboard input may be automatically transferred to the OS 203 running on the SPS 103. The mouse cursor movement may be locked within the window of the virtual screen 102. The cursor and keyboards may be released back to other host PC programs or the host PC OS 212 by hitting the Escape key. This process is covered and explained by U.S. patent application Ser. No. 12/386,210 for "System and Method for Implementing a Remote Input Device Using Virtualization Techniques for a Wireless Device," which is incorporated fully by reference herein.

Network Access

The SPS 103 may establish network access with a network bridge between the host PC network 210 to the outside world through a USB CDC/Ethernet port. There may be a firewall on the front end of the SPS network port 204 to block direct access of the file system or data on the SPS OS 203. To enhance security, the SPS 103 may only access the outside world via a VPN or other encrypted server. In this way, the host PC 100 may not have access to any unencrypted data from the SPS 103 passing through its network port.

The Smart Chip Device on the SPS

The primary use of the smart chip 208 may be to store keys or passwords used by the SPS 103. The smart chip 208 may also contain the encryption and decryption algorithm used for the data/file system and network access.

Usage Model of the SPS with a PC

The host PC 100 may run an operating system 212 such as Windows XP, Windows Vista, or a Mac OS, but is not limited to these operating systems. In one aspect of the present invention, the SPS 103 may be in a USB form factor. In another aspect, this USB SPS 103 may be connected to any USB port 104 on a host PC that may even be booted up. The SPS 103 may be a composite USB device containing a CDC/Ethernet class component and a CD-ROM component. The application stored in the CD-ROM component 207 may auto-run when the SPS 103 is connected to the host PC 100. This application 207 may open up a window 102 on the host PC screen 101 and set up the network bridge 217 between the host PC 100 and the SPS 103. The SPS OS 203, may show the boot up screen for the SPS 103 in the window 102 on the host PC screen 101. Matchbox may be used as the desktop GUI 302 on the SPS 103. Password challenges may function as a process for login to gain access to the SPS 103. The host PC mouse cursor and keyboard input 213 may be transferred to the SPS OS 203 to navigate and launch a program in the SPS file system. A network connection to the outside world may be established either via VPN or an encrypted link to a secure server. A web browser or application may use the secure network to communicate with the outside world. The host PC 100 may see the SPS 103 as a network device, but the SPS device 103 will be blocked by a firewall on the SPS network connection 204. No files or data may be transferred between the SPS 103 and the host PC 100 with a firewall enabled on the SPS network connection 204.

Other Usage of the SPS

Figure 4:
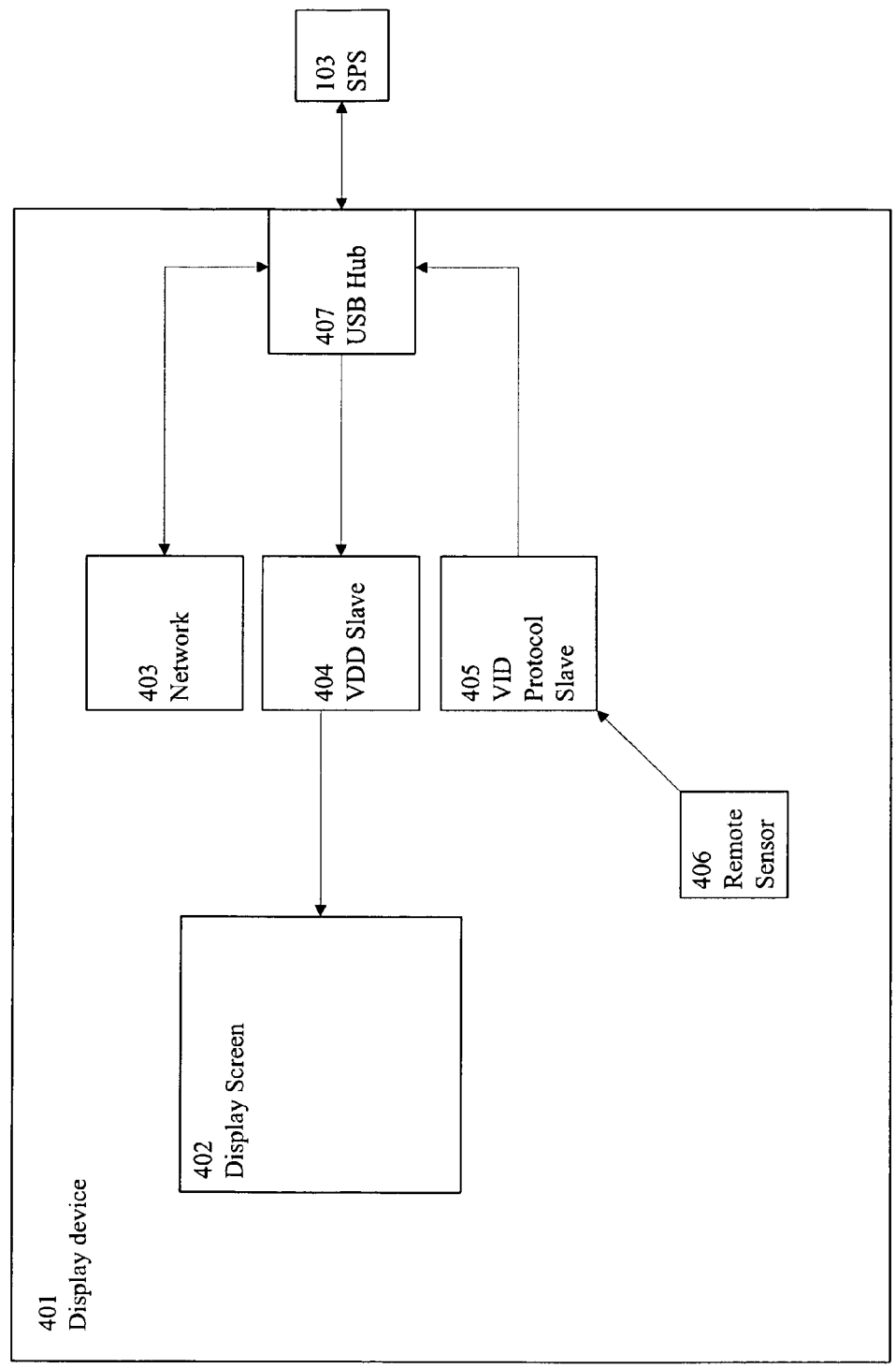
FIG. 4 illustrates a block diagram showing the block diagram for web connectivity or network applications according to an embodiment of the invention.

The SPS 103 may enable TV, digital photo frame, or other display device 401 functionality with web connectivity or a network application like email, messaging applications, and even games with or without the smart chip 208. In one embodiment, the SPS 103 may communicate with a display device 401 via a USB hub 407 on the display device 401. This may be accomplished by implementing the VDD Slave for the SPS display 404 and displaying it on the display device 402. Input from the user may be accomplished by receiving IR remote instructions via a remote sensor 406, where a VID protocol slave application 405 sends the instructions of the IR remote to the SPS OS 203. Network connectivity may be achieved using a wireless, Ethernet, or USB device connection 403, but is not limited to these. A USB network device may only require a standard driver to be installed in the SPS OS 203. FIG. 4 illustrates the block diagram for web connectivity or network applications.

Figure 5:
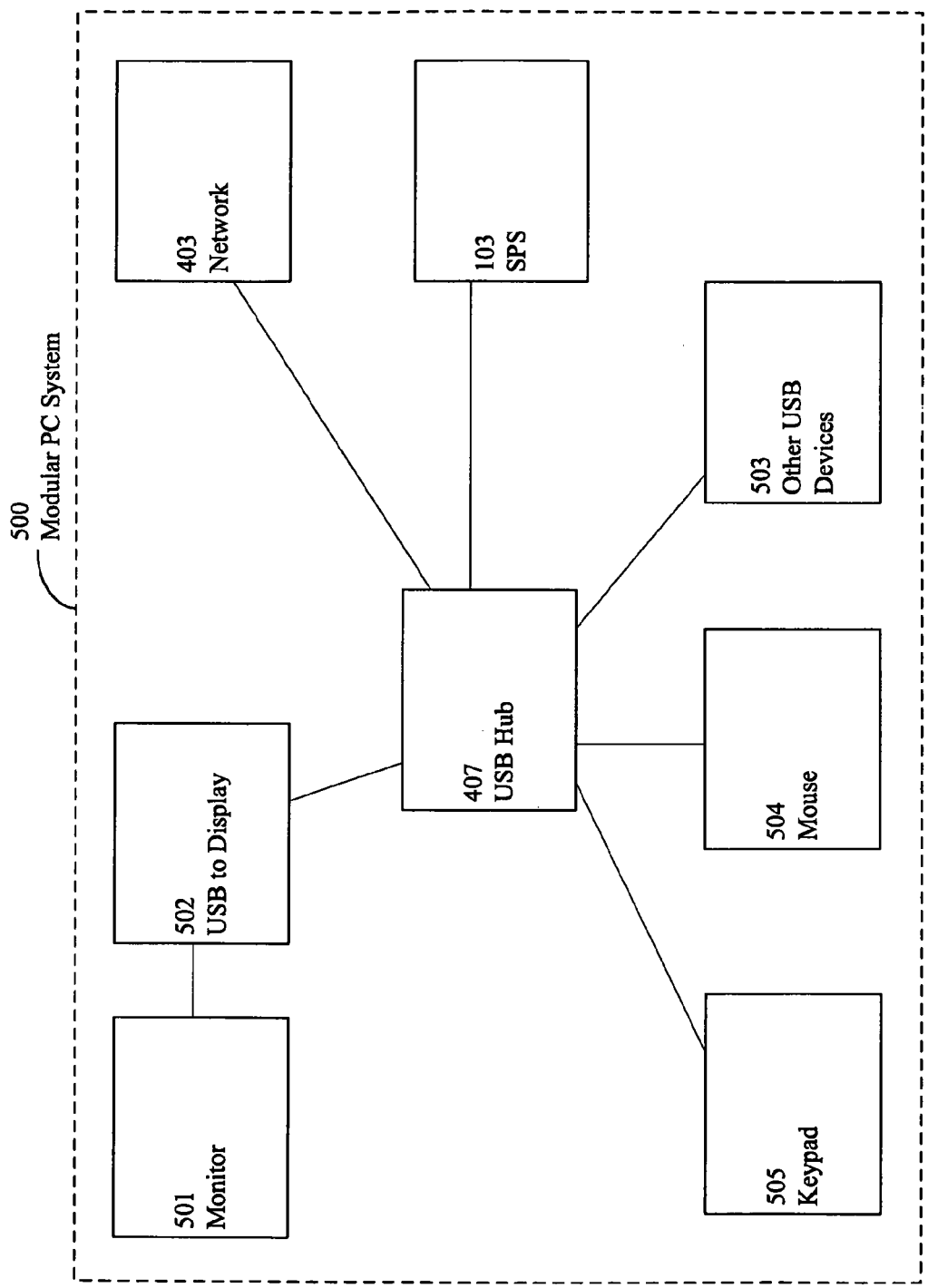
FIG. 5 illustrates a block diagram showing how a modular PC system using standard USB devices can be built according to an embodiment of the invention.

Another application of the SPS 103 may be to build a modular PC 500 using standard USB devices. FIG. 5 illustrates how a modular PC system 500 using standard USB devices can be built. A Linux OS may be installed, requiring standard Linux drivers for the USB devices to make them work together as a modular PC 500. In this aspect, the SPS 103 may be the USB host device. In one embodiment, the SPS 103 may connect to a USB hub 407. In further embodiments, the USB hub 407 may be connected to a network device 403, a keypad 505, a mouse 504, other USB devices 503, and a USB connection to a display 502. The USB connection to a display 502 may join a monitor 501 to the SPS 103 via the USB hub 407.

Although a particular embodiment has been described, this was for the purpose of illustrating, but not limiting, the invention. Various alternative embodiments, which will come readily to the mind of the person skilled in the art, are within the scope of the invention as defined by the appended claims.

The invention claimed is:

1. A system for implementing a secure processor stick with a computer, the system comprising:
 a secure processor stick, including:
  a processor;
  a memory coupled to said processor;
  a smart chip coupled to said processor, said smart chip storing data for implementing a secure environment; and
  an operating system adapted to run on said memory and said processor, wherein said operating system is adapted to provide a secure environment for display on a computer using said data, and
 wherein said smart chip is configured to interface, by means of said operating system, directly through a physical connection with an input/output of said secure processor stick, thereby allowing said processor to run application programs without leaving data on the computer, preventing the computer from gaining unauthorized access to any data stored in said memory, and permitting transmission of encrypted data from said secure processor stick to said computer.

2. The system of claim 1, wherein said secure processor stick adheres to one or more of a SIM, SAM, SD, micro SD, or USB dongle form factor.

3. The system of claim 1, wherein said secure processor stick is adapted to communicate with a PC through a communication link.

4. The system of claim 3, wherein said communication link is one or more of a USB, firewire, or network connection to said PC.

5. The system of claim 3, wherein said secure processor stick communicates with said PC using one or more of VPN, SSL, or other encryption.

6. The system of claim 3, wherein an application of said secure processor stick is displayed on said PC.

7. The system of claim 6, wherein said application is transferred from a virtual screen bitmap in said secure processor stick to said PC.

8. The system of claim 1, wherein said data stored on said smart chip includes keys, passwords, or a data encryption algorithm.

9. The system of claim 1, wherein said secure processor stick contains a firewall.

10. The system of claim 1, wherein said secure processor stick is adapted to display data on one or more of a monitor, television, or digital photo frame.

11. A system for providing a secure computing environment on a PC using a secure processor stick, the system comprising:
 a secure processor stick, including:
  first processor;
  a first memory coupled to said first processor;
  a smart chip coupled to said first processor, said smart chip storing data for implementing a secure environment; and
  a first operating system adapted to run on said first memory and said first processor;
 a PC, including:
  a second processor;
  a second memory coupled to said second processor; and
  a second operating system adapted to run on said second memory and said second processor;
 wherein said secure processor stick is adapted to communicate with said PC;
 wherein said first operating system is adapted to provide a secure environment for display on said PC; and
 wherein said smart chip is configured to interface, by means of said first operating system, directly through a physical connection with an input/output of said secure processor stick, thereby allowing said first processor to run application programs without leaving data on said computer, preventing said computer from gaining unauthorized access to any data stored in said first memory, and permitting transmission of encrypted data from said secure processor stick to said computer.

12. The system of claim 11, wherein said secure processor stick adheres to one or more of a SIM, SAM, SD, micro SD, or USB dongle form factor.

13. The system of claim 11, wherein said secure processor stick is adapted to communicate with said PC through a communication link.

14. The system of claim 13, wherein said communication link is one or more of a USB, firewire, or network connection to said PC.

15. The system of claim 13, wherein said secure processor stick communicates with said PC using one or more of VPN, SSL, or other encryption.

16. The system of claim 13, wherein an application of said secure processor stick is displayed on said PC.

17. The system of claim 16, wherein said application is transferred from a virtual screen bitmap in said secure processor stick to said PC.

18. The system of claim 11, wherein said data stored on said smart chip includes keys, passwords, or a data encryption algorithm.

19. The system of claim 11, wherein said secure processor stick contains a firewall.

20. The system of claim 11, wherein said first operating system is Linux, Windows, or Symbian.

21. The system of claim 11, wherein said second operating system is Windows XP, Windows Vista, Windows 7, or a Mac OS.

22. The system of claim 11, wherein said secure processor stick provides said first operating system on said PC.

23. A system for building a modular PC from a secure processor stick, the system comprising:
 a secure processor stick, including:
  a processor;
  a memory coupled to said processor;

a smart chip coupled to said processor, said smart chip storing data for implementing a secure environment; and an operating system adapted to run on said memory and said processor, wherein said operating system is adapted to provide a secure environment for display on a computer; wherein said smart chip stores a data encryption algorithm and key;

wherein said smart chip is configured to interface, by means of said operating system, directly through a physical connection with an input/output of said secure processor stick, thereby allowing said processor to run application programs without leaving data on said computer, preventing said computer from gaining unauthorized access to any data stored in said memory, and permitting transmission of encrypted data from said secure processor stick to said computer; and computing peripherals, including:

a display;
an input device; and
a network device;
wherein said secure processor stick is adapted to communicate with said computing peripherals.

24. The system of claim 23, wherein said input device includes one or more of a keypad, joystick, push button, keyboard, touch screen, or trackball.

25. The system of claim 23, wherein said secure processor stick adheres to one or more of a SIM, SAM, SD, micro SD, or USB dongle form factor.

26. The system of claim 23, wherein said operating system is Linux, Windows, or Symbian.

27. The system of claim 23, wherein said data stored on said smart chip includes keys, passwords, or a data encryption algorithm.

28. The system of claim 23, wherein said secure processor stick contains a firewall.

* * * * *